Dec. 31, 1935. B. B. WEAVER Re. 19,803

MULTI-PLY BAG

Original Filed Dec. 15, 1932 3 Sheets-Sheet 1

Inventor
Brenton Bigelow Weaver

By Ross C. Hurney
Attorney

Dec. 31, 1935. B. B. WEAVER Re. 19,803

MULTI-PLY BAG

Original Filed Dec. 15, 1932 3 Sheets-Sheet 2

Inventor

Brenton Bigelow Weaver

By Ross C. Hurney Attorney

Dec. 31, 1935. B. B. WEAVER Re. 19,803

MULTI-PLY BAG

Original Filed Dec. 15, 1932 3 Sheets-Sheet 3

Inventor

Brenton Bigelow Weaver.

By Ross C. Hurey

Attorney

Reissued Dec. 31, 1935 Re. 19,803

UNITED STATES PATENT OFFICE 19,803

MULTI-PLY BAG

Brenton Bigelow Weaver, Montreal, Quebec, Canada, assignor to Bagpak, Inc., a corporation of Delaware Original No. 1,946,995, dated February 13, 1934, Serial No. 647,297, December 15, 1932. Application for reissue May 17, 1935, Serial No. 22,021

13 Claims. (Cl. 150—9)

My invention relates to multi-ply bags, particularly to multi-ply valve bags for cement and other pulverulent materials.

The ordinary valve bag possesses certain disadvantages due to the heretofore inevitable leakage through the valve opening. Various attempts have been made to close or partially close this opening, as by stitches or clips through the valve mouth. Such expedients, however, require an additional closing step after filling and thus largely nullify the most important advantage of the valved type of bag.

The primary object of my inventon is to make a valve bag, the valve of which will remain closed under any circumstance after filling the bag.

A further object of my invention is to make a valve bag of the inserted sleeve type having a durable sleeve therein which will not tear loose from the bag walls and is proof against accidental rupture by a filling spout.

Another object of my invention is to make a valve bag of the inserted sleeve type, the sleeve of which is adapted to be folded within itself so as to prevent any sifting of material through the valve.

A still further object of my invention is to make a strong, rounded valve opening which can easily be drawn over a filling spout.

My improved bag is of simple construction and may be made on existing machines with very little adjustment of parts.

Referring to the accompanying drawings in which like figures refer to the same parts:

Figure 11:
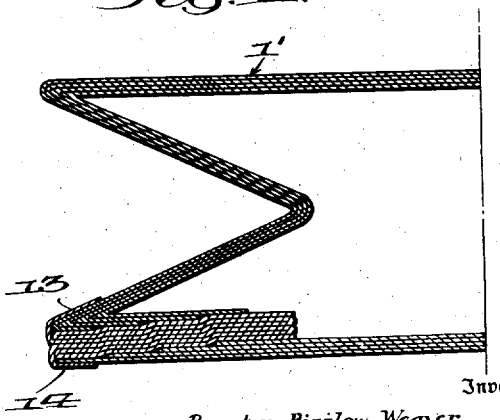
Fig. 11 shows the valve sleeve as placed upon a gusseted bag length.

The bags as illustrated are of four-ply construction, each ply formed of a strip of paper or other fabric formed into a tube with the edges of the strip overlapping and adhered to each other. Each such tube is nested within another tube with the overlapped edges of each tube substantially abutting the edges of adjacent tubes. The nested tubes may be formed in any manner known in the art, as the invention is not directed to that feature. The tubes are formed flat and cut into lengths suitable for bags. The valve sleeve may be formed of any suitable material, such as that which makes up the bag and other kinds and qualities of paper or fabrics may be used. While the invention is preferably applied to the flat type of bag, it can be and is applied to the gusseted bag as shown in Fig. 11. I have illustrated my invention as applied to four-ply bags, but obviously a greater or lesser number of plies may be used without departing from the spirit of the invention.

Figure 1:
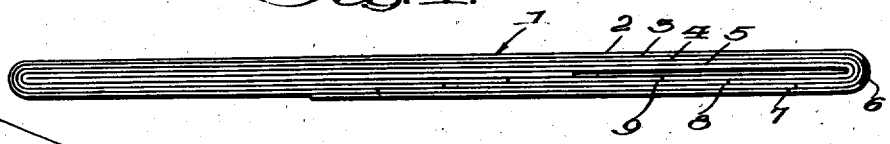
Fig. 1 is an end view of a four-ply bag length showing the slits made in each ply to form the valve opening.

Referring to Fig. 1, the bag length 1 is shown as formed of four nested tubes 2, 3, 4 and 5. The tube 2 is slit at 6 for a short distance longitudinally thereof at the fold formed when the tubes are flattened; the tube 3 is similarly slit at 7, a short distance inwardly from the fold; and the tubes 4 and 5 are slit progressively inward from the fold at 8 and 9 respectively; thus forming an opening 10 (Fig. 2) extending diagonally inward through the side wall of the bag from the fold toward the center.

Figure 2:
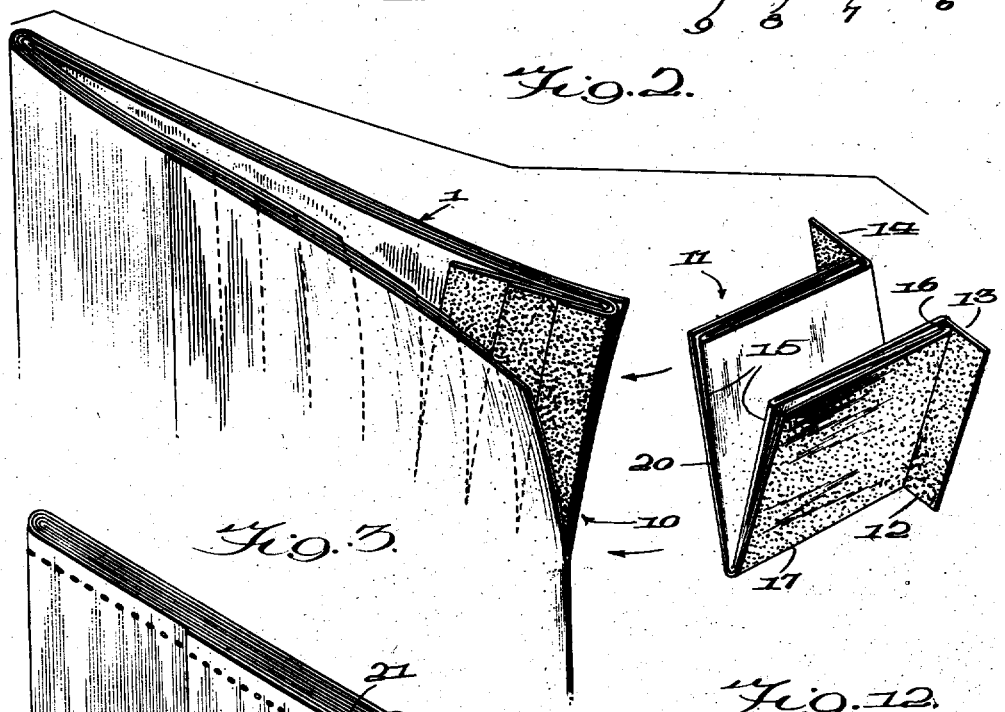
Fig. 2 is a perspective of the bag length of Fig. 1, showing the opening expanded, and one form of valve sleeve.
Figure 3:
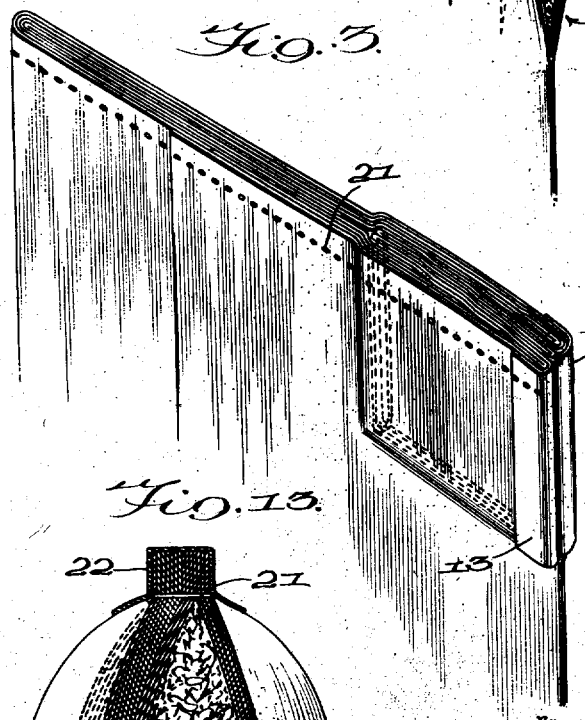
Fig. 3 is a perspective of the bag having the sleeves in place.
Figure 4:
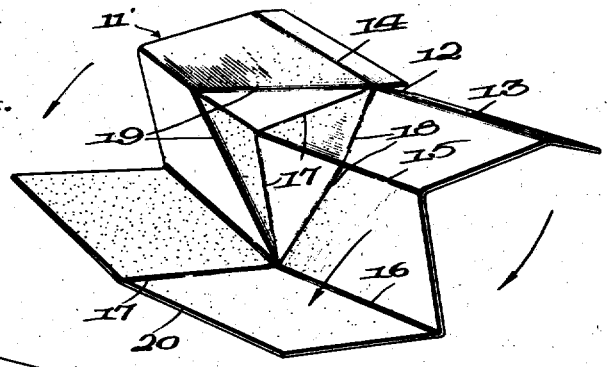
Fig. 4 is a perspective view of a modified valve sleeve, partially unfolded.
Figure 5:
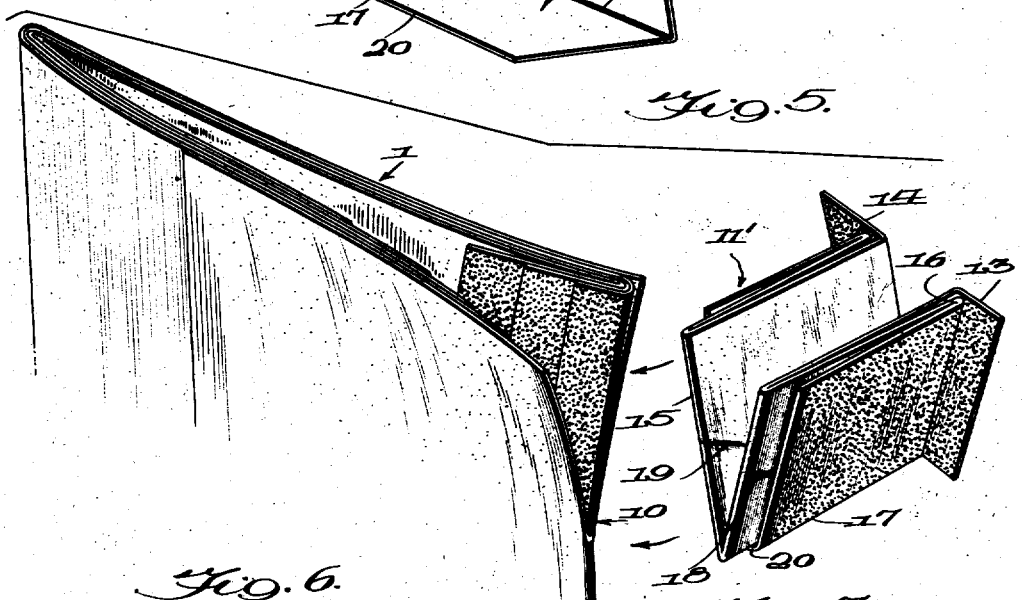
Fig. 5 is a perspective view of a bag length and the valve sleeve of Fig. 4.
Figure 6:
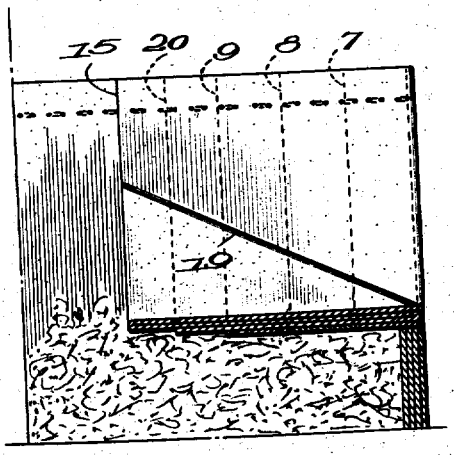
Fig. 6 is a sectional view taken along the center of the completed bag and valve sleeve of Fig. 5.
Figure 7:
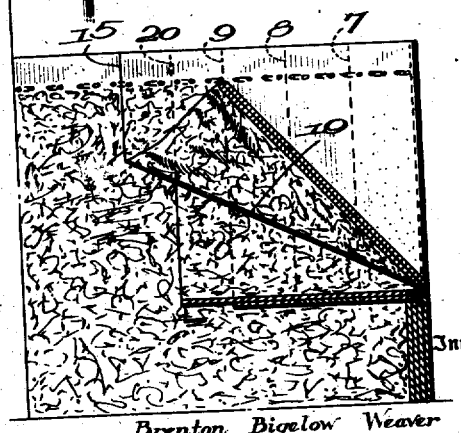
Fig. 7 is a view similar to Fig. 6 showing the valve sleeve of Fig. 5 as positioned after the bag is filled.

One form of sleeve 11 is illustrated in Fig. 2, reference being made to Fig. 4 to clarify its construction. A sheet of paper or other fabric is slit along its center line for a short distance at 12 so as to form two flaps 13 and 14. The remainder of the sheet is folded upon itself at 15 and 16 to form a blank of three thicknesses or plies, with the fold 15 substantially even with the edge 20 and the fold 16 abutting the flaps 13 and 14. This blank is then doubled upon itself by folding along the line 17 to form a substantially V-shaped sleeve. Adhesive may be applied to the outer faces of the sleeve 11, or to the sides of the opening 10, or to both surfaces as illustrated. The sleeve is then placed in the opening 10, with its upper edge flush with the upper edge of the bag, the fold 16 flush with the fold of the bag, and flaps 13 and 14 folded around the edges of the opening 10 and adhered to the outer bag-ply 2. The bag mouth is then closed by a line of stitches 21 running across its upper edge and including the upper edge of the sleeve 11, the other end of the bag being closed in any desired manner such as by similarly placed stitches. Strips of crinkly kraft paper or other fabric 22 may be folded over the ends of the bag and adhered to the outer ply 2 as an additional means of preventing loss of finely powdered material.

It will be understood that the sleeve 11 may be formed of a plain sheet of one thickness, or merely doubled, but it has been found that a sleeve formed of three thicknesses or plies as illustrated possesses the desired qualities and is proof against accidental rupture by the filling spout.

Referring to Figs. 4 to 7, another form of sleeve 11' is illustrated. This sleeve is made substantially the same as sleeve 11 (Fig. 2) except that fold 15 extends beyond edge 20 and the inner plies are creased at 18 and 19, substantially from the end of slit 12 at the bottom of the V diagonally upward toward the open end of fold 15, for a purpose to be disclosed.

Figure 8:
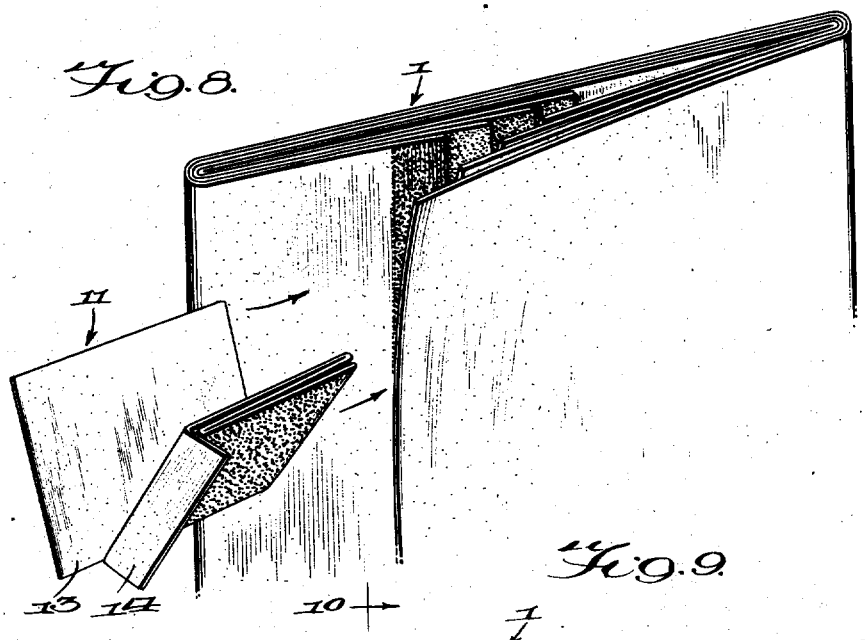
Fig. 8 is a perspective view showing a valve sleeve about to be inserted through the edges of the nested tubes of a multi-ply bag.
Figure 9:
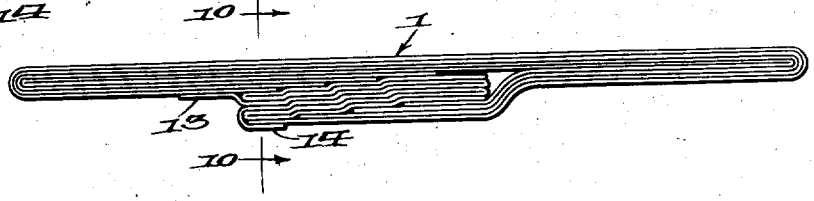
Fig. 9 is an end view of the bag of Fig. 8 with the sleeve in place.
Figure 10:
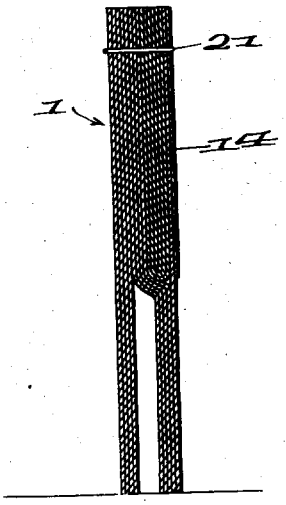
Fig. 10 is a section taken on line 10—10 of Fig. 9.

Figs. 8, 9 and 10 show a modified form of construction in which either sleeve 11 or 11' is embedded in the side wall of the bag through the opening formed by the edges of the nested tubes, the flaps 13 and 14 being adhered to the outer ply 2 as before. It can readily be seen that the edges of the tubes do not need to be at the center of the bag and that as they approach the fold a construction will be obtained closely approximating that of Fig. 2. In this form it is not necessary to slit the bag plies as at 6, 7, 8, 9 (Fig. 1). The sleeve may be applied to a gussetted bag in the same manner.

Fig. 11 illustrates the invention as applied to a gussetted bag 1'. In this construction one of the folds of the gusset is slit in the same manner as the fold of the flat bag of Fig. 2, and the sleeve, 11 or 11', may be inserted as illustrated. This type of bag is similarly closed by sewing through its end edges, the stitches including the upper edge of the sleeve and the gussets, and may also have strips of fabric folded over its ends and adhered thereto.

In each of the illustrated forms the features of my invention are embodied. The valve in each form consists of a sleeve firmly embedded in the side wall of the bag and having protecting flaps covering the edges of the opening into which it is inserted and adhered to the outer bag-ply, thus forming a durable reenforced valve mouth which can be easily slipped over a filling spout.

Figure 12:
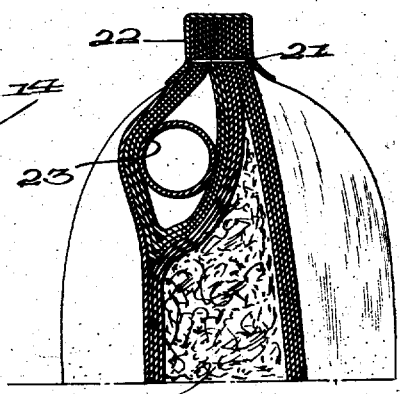
Fig. 12 is a section of the bag of Fig. 3 in the course of being filled.
Figure 13:
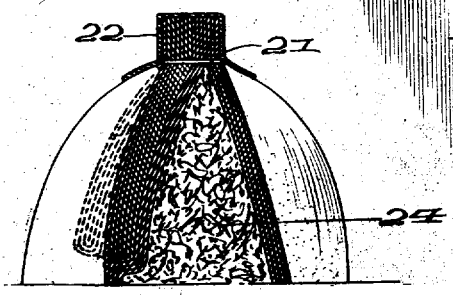
Fig. 13 is a section of the same bag in its completely filled state.

Fig. 12 illustrates the finished bag in the course of being filled with pulverulent material 24 discharged through a filling spout 23. In sleeved valve bags as heretofore constructed the sleeve is inserted directly through the fold of the bag. The material in such a bag, pressing against the sleeve, tends to hold it closed by pressure on the sleeve alone. This type of valve sleeve does not always remain closed, especially if the bag is frequently handled and the contents shift from side to side. Fig. 13 illustrates how my improved valve overcomes this defect. The sleeve, being embedded in the side walls, is held closed not only by the pressure of the pulverulent material on the area of the sleeve itself, but also by the inherent stiffness of the bag wall and the pressure of the material against a large portion of the wall enclosing the sleeve, thus making a valve which will be held closed under any circumstance. Another readily apparent feature of my improved bag is that since the sleeve penetrates the inner ply of the bag at a point removed from the fold there is no opportunity for the pressure holding it shut to be removed by a shift of the material to the other side.

The form of sleeve 11' illustrated in Figs. 4 to 7 further prevents any loss of finely powdered material which in older types of bags could not be prevented from sifting through the valve mouth. This sleeve, as has been pointed out, is creased at 18 and 19. After filling the bag the projecting point of fold 15 may be grasped and pulled upwardly into the sleeve, the creases 18 and 19 forming lines along which the inner plies of the sleeve will easily fold. The fold 15 is made to project beyond the edge 20 so that whatever means may be used to pull it upwardly will not also engage the edge 20 and tear the entire sleeve from adherence to the bag plies. A simple means of effecting the closure of the valve just described is to provide a hook-like projection on the under side of the filling spout so placed as to engage the fold 15 and draw it into the sleeve as the spout leaves the opening. The fold 15 extends far enough beyond the edge 20 so that the pressure from beneath, as the bag is filled, will lift the bottom of the fold to the top of the bag, thus causing it to enter and close the sleeve, so that a grasping or hooking action is not essential to a functioning of the fold as a valve. It is to be understood that the inner plies of sleeve 11 may be also creased as at 18 and 19, or that the creases may be dispensed with altogether, it being apparent that my sleeve in any of its forms may have its inner plies pulled upwardly as in Fig. 7. The flap, so formed, effectively closes the valve opening against any leakage whatsoever, preventing any finely powdered material which may sift through the inner end of the sleeve from escaping.

It will be apparent that a valve bag constructed according to my invention will at all times remain closed due to the pressure of the bag's contents, and that none of the contents can sift through the valve. It will also be apparent that a durable construction is obtained and that the rounding of the valve mouth enables the bag to be easily slipped over a filling spout.

As will be evident to those skilled in the art, my invention permits various modifications without departing from the spirit thereof, and I do not intend to be limited except as set forth in the subjoined claims which are to be broadly construed.

I claim:

1. A multi-ply bag having a valve sleeve embedded in a side wall, the sleeve having flaps extending therefrom and adhered to the outer bag-ply.

2. A multi-ply valve bag having a valve sleeve embedded in a side wall and extending diagonally inward, the sleeve having flaps extending outward and adhered to the outer bag-ply.

3. A multi-ply valve bag having a valve sleeve embedded in a side wall formed of a sheet of paper or other fabric folded upon itself to form a sleeve of three plies, the inner plies extending into the bag beyond the outer ply and having creases therein forming lines along which they may be folded up within the outer ply.

4. A valve sleeve for valve bags formed of a sheet of paper or other fabric folded upon itself to form a multi-ply blank, the blank being doubled upon itself to form a V-shaped sleeve, a ply of the sleeve projecting beyond other plies and slit to form flaps.

5. A valve sleeve for valve bags formed of a sheet of paper or other fabric folded upon itself to form a multi-ply blank, certain of the plies exceeding the remainder in one dimension, the blank being folded to form a V-shaped sleeve with a smaller ply outside, and the inner plies having creases extending substantially from the bottom of the V diagonally upward toward the open end.

6. In the sleeve as described in claim 5, the innermost ply projecting beyond the others and being slit to form flaps.

7. A multi-ply valve bag formed of nested tubes having the outer tube slit at the fold from one end a short distance longitudinally thereof, the other tubes being similarly slit at progressive intervals inwardly from the fold, the slits forming a valve opening extending from the fold diagonally through the wall of the bag, and a sleeve inserted in said opening and having an end secured to the outer surface of the bag.

8. A multi-ply valve bag formed of nested tubes having the outer tube slit at the fold from one end a short distance longitudinally thereof, the other tubes being similarly slit at progressive intervals inwardly from the fold, the slits forming a valve opening extending from the fold diagonally through the wall of the bag, and a valve sleeve embedded in the opening and adhered to the sides thereof and having flaps extending outwardly and adhered to the outer tube.

9. A multi-ply valve bag formed of nested tubes having the outer tube slit at the fold from one end a short distance longitudinally thereof, the other tubes being similarly slit at progressive intervals inwardly from the fold, the slits forming a valve opening extending from the fold diagonally through the wall of the bag, and a valve sleeve embedded in the opening and adhered to the sides thereof and having flaps extending outwardly and adhered to the outer tube, the mouth of the bag being closed by a line of stitches including the upper edge of the sleeve.

10. A multi-ply valve bag formed of nested tubes having the outer tube slit at the fold a short distance longitudinally thereof from one end, the other tubes being similarly slit at progressive intervals inwardly from the fold, the slits forming a valve opening extending from the fold diagonally through the wall of the bag, a valve sleeve embedded in the opening and adhered to the sides thereof having flaps extending therefrom and adhered to the outer tube, the bag being closed by a line of stitches along the upper edge and including the upper edge of the sleeve, and a strip of crinkly kraft paper folded over the end of the bag and adhered to the outer tube.

11. A paper bag comprising a tube closed at both ends and having a valve opening, a sleeve secured in said opening, said sleeve having a portion for engagement with means associated with the filling spout inserted through the valve opening for filling said bag, and means formed within said sleeve to facilitate drawing said portion into said opening, upon a withdrawal of the filling spout, to close said valve.

12. A paper bag comprising a tube closed at both ends and having a valve opening at one end, and a sleeve secured in the opening, said sleeve consisting of an outer portion and a relatively loose inner portion surrounded by said outer portion and secured at its outer end whereby a filling spout may be inserted through said sleeve without disturbing the relative arrangement of the portions of the sleeve and whereby the inner end of said inner portion may be drawn back within said outer portion and caused to block the opening upon withdrawal of the filling spout.

13. A paper bag comprising a tube closed at both ends by closure means and having a valve opening at one end, and a sleeve secured in the opening having an edge retained by the closure means of the adjacent end of the bag tube, said sleeve consisting of an outer portion and a relatively loose inner portion surrounded by said outer portion and secured at its outer end whereby a filling spout may be inserted through said sleeve without disturbing the relative arrangement of the portions of the sleeve and whereby the inner end of said inner portion may be drawn back within said outer portion and caused to block the opening upon withdrawal of the filling spout.

BRENTON BIGELOW WEAVER.